(12) United States Patent
Seidlitz et al.

(10) Patent No.: US 7,648,635 B2
(45) Date of Patent: Jan. 19, 2010

(54) METHOD AND DEVICE FOR THE EXTRACTION OF SUBSTANCES FROM LIQUIDS OR SOLIDS DISPERSIONS

(75) Inventors: Helmut Seidlitz, Ternitz (AT); Eduard Lack, Wiener Neustadt (AT)

(73) Assignee: Natex Prozesstechnologie Gesmbh, Ternitz (AT)

( * ) Notice: Subject to any disclaimer, the term of this patent is extended or adjusted under 35 U.S.C. 154(b) by 290 days.

(21) Appl. No.: 10/526,003

(22) PCT Filed: Aug. 26, 2003

(86) PCT No.: PCT/AT03/00246

§ 371 (c)(1),
(2), (4) Date: Feb. 25, 2005

(87) PCT Pub. No.: WO2004/018070

PCT Pub. Date: Mar. 4, 2004

(65) Prior Publication Data

US 2006/0000781 A1 Jan. 5, 2006

(30) Foreign Application Priority Data

Aug. 26, 2002 (AT) .............................. A 1274/2002

(51) Int. Cl.
*B01D 11/00* (2006.01)
(52) U.S. Cl. ...................... 210/634; 210/511; 422/208; 422/226

(58) Field of Classification Search ................. 210/511, 210/634, 639, 512.1, 787; 422/256–259, 422/129, 173, 198, 208, 225, 226, 242; 209/1, 209/131, 132, 155; 261/83; 494/50, 51; 203/14, 16; 208/339, 353; 426/8–23; 196/14.52
See application file for complete search history.

(56) References Cited

U.S. PATENT DOCUMENTS

| | | | |
|---|---|---|---|
| 2,281,796 A * | 5/1942 | Podbielniak | 261/83 |
| 2,474,006 A | 6/1949 | Maylock | |
| 2,819,015 A * | 1/1958 | Vaughan | 494/22 |
| 4,349,415 A * | 9/1982 | DeFilippi et al. | 203/14 |
| 4,668,398 A | 5/1987 | Silvis | |
| 4,871,460 A * | 10/1989 | Robin et al. | 210/634 |
| 6,106,720 A * | 8/2000 | Kanel et al. | 210/634 |
| 6,752,529 B2 * | 6/2004 | Holl | 366/279 |

FOREIGN PATENT DOCUMENTS

| | | |
|---|---|---|
| DE | 29 22 645 A | 12/1980 |
| GB | 735 422 A | 8/1955 |
| SU | 512772 | 5/1976 |

* cited by examiner

*Primary Examiner*—Joseph W Drodge
(74) *Attorney, Agent, or Firm*—Davis & Bujold, P.L.L.C.

(57) ABSTRACT

In a method for extracting ingredients, particularly foreign substances, from liquids or solids dispersions by using compressed extraction agents such as, for instance, supercritical or liquid carbon dioxide, the liquid or dispersion is applied as a thin film in a pressure-tight reactor and the surface of the thin film is treated with the extraction agent, particularly carbon dioxide, wherein the surface of the thin film is constantly renewed over at least a portion of the layer thickness of the thin film by mechanically acting on said liquid or dispersion.

6 Claims, 1 Drawing Sheet

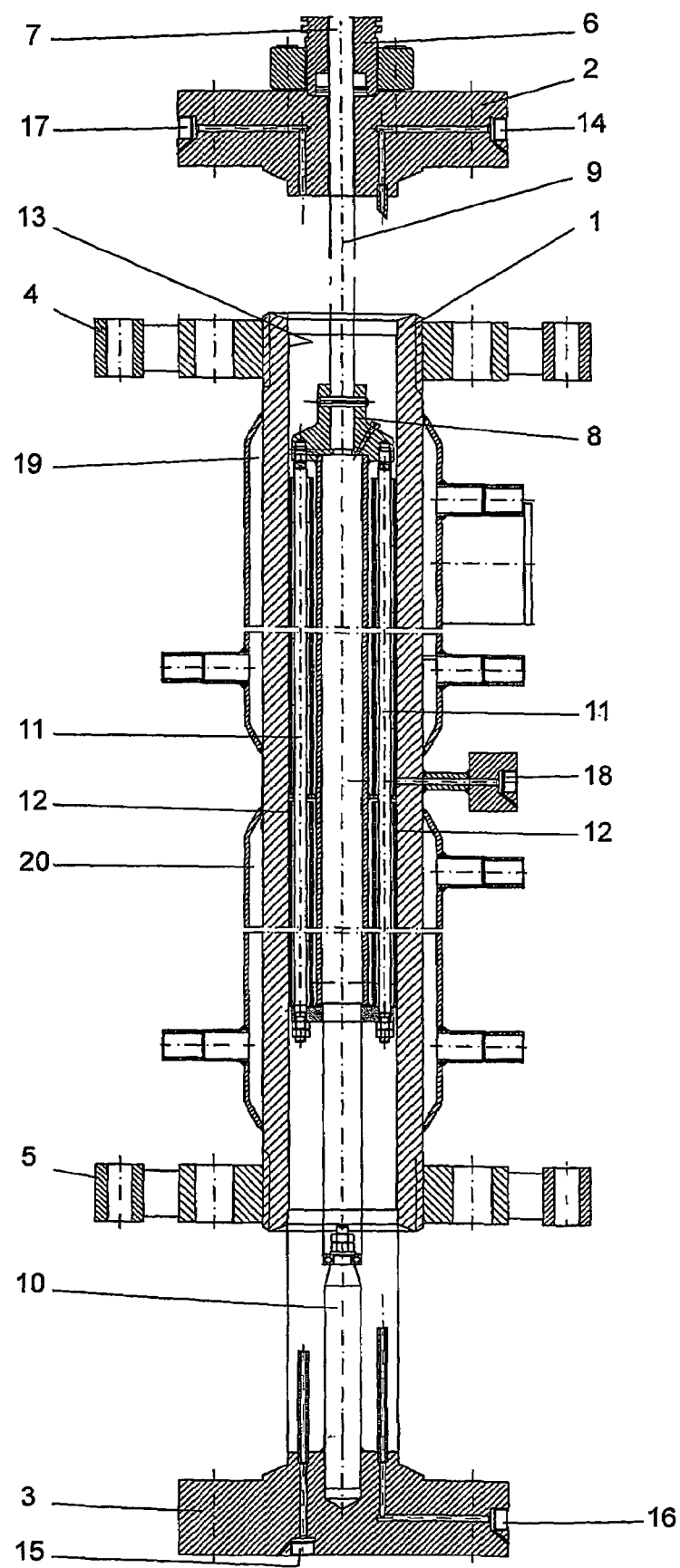

METHOD AND DEVICE FOR THE EXTRACTION OF SUBSTANCES FROM LIQUIDS OR SOLIDS DISPERSIONS

This Application is a national phase application of 371 Application PCT/AT03/00246, filed Aug. 26, 2003, which claims the benefit of Austrian patent application 1274/2002, filed Aug. 26, 2002.

FIELD OF THE INVENTION

The invention relates to a method for extracting components, particularly foreign substances or impurities, from liquids or solids dispersions by using compressed extraction agents such as, for instance, supercritical or liquid carbon dioxide, as well as a device for carrying out said method.

BACKGROUND OF THE INVENTION

The extraction with supercritical gases has already been used on an industrial scale for more than 20 years. Main applications include the discontinuous processing of solids in the food industry. Continuous methods for separating liquids by the aid of supercritical gases have already been proposed too, wherein the field of application using high-pressure columns is limited to liquids exhibiting low viscosities, no solids portions and no tendency to foaming or solids precipitation under the applied conditions. Stirrers may be employed when using viscous liquids, wherein blending as intensive as possible, of the solvents and the liquid to be extracted is essential and liquid-liquid extractions, as a rule, require a number of auxiliary agents in order to appropriately reduce the viscosities of the liquids to be extracted. The separation of oils from lecithin is an example of a particularly demanding extraction. In order to avoid the difficulties involved in columns and to ensure, even with higher-viscosity liquids, that the extraction fluid will be intensively mixed in an appropriate manner with the liquid to be extracted, spray-extraction methods have been proposed, in which the material to be extracted is contacted with the supercritical fluid as extraction agent or solvent by being sprayed in the form of extremely fine droplets. Yet, in order to ensure appropriate sprayability, elevated temperatures are usually required to lower the viscosity, a method of this type, thus, having its limits when employed with temperature-sensitive substances. This applies also to molecular vapor distillation, which serves to separate useful materials from highly viscous media. During spraying, the droplets tend to rapidly agglomerate anew, particularly if the liquids concerned are relatively viscous, and hence a sufficiently intensive contact of the solvent will only occur with the surfaces of such droplets. As a result, a concentration gradient will rapidly form in the interior of the droplets, whereby also the viscosity may accordingly vary due to the resulting different chemical composition throughout the radius, so that an effective extraction will no longer be feasible from the comparatively hard cores of such droplets.

SUMMARY OF THE INVENTION

The invention aims to expand the field of application of fluid extractions to media that have so far been only difficult to extract, and, in particular, render feasible the processing of structurally viscous media, and to provide the option to process raw materials having relatively high solids portions. Especially the extraction of disperse systems having high solids portions is hardly feasible by spraying methods without entailing the risk of the nozzles being obstructed. Even slightly foaming products are to be processable by the method according to the invention, and is should be feasible during said method to destroy possibly formed foam.

To solve this object, the method according to the invention of the initially defined kind consists essentially in that the liquid or dispersion is applied as a thin film in a pressure-tight reactor and the surface of the thin film is treated with the extraction agent, particularly carbon dioxide, whereby the surface of the thin film is constantly renewed over at least a portion of the layer thickness of the thin film by mechanically acting on said liquid or dispersion. Due to the fact that the liquid or dispersion is applied as a thin film in a pressure-tight reactor, the surface required for the attack by the extraction agent and the optimum mass transfer into the compressed extraction agent will be provided, whereby in this case, as in the extraction of sprayed droplets, the risk of a concentration gradient forming over the size of the layer thickness cannot, of course, be excluded a priori. However, due to the fact that the surface of the thin film is constantly renewed by the mechanical treatment of said liquid or dispersion simultaneously with the treatment of the thin film with the extraction agent, it is feasible to exert shearing forces and milling forces on the film, which provoke accordingly high turbulences in the interior of the film, thus constantly conveying to the surface respectively new partial regions of the layer thickness. The thin layer of the film is, thus, thoroughly worked through mechanically, wherein it is, at the same time, feasible by such mechanical devices to adjust the respectively desired layer thickness of the film. It is, thus, altogether feasible to constantly even out the respective distribution of the extractable substances within the film by mechanical treatment and to continuously ensure optimum blending within the film, with possibly forming lumps and aggregates being destroyed by mechanical treatment. In a particularly advantageous manner, the renewal of the surface of the thin film is effected by the aid of wipers, rollers or doctor blades while simultaneously adjusting the layer thickness so as to immediately provide the desired millability and hence the turbulences desired to take place within the film.

BRIEF DESCRIPTION OF THE DRAWINGS

The device according to the invention, for carrying out said method includes a pressure-tight reactor having at least one charging opening for the liquid or dispersion to be treated and the compressed extraction agent as well as appropriate discharge openings, and is essentially characterized in that the charging opening for the liquid or dispersion to be treated opens on the inner shell of the reactor, and that a rotor is arranged in the interior of the reactor, the radial arms of said rotor cooperating with the liquid or dispersion film on the inner shell of the reactor. By using a reactor with a rotor arranged in its interior it has become possible to provide the mechanical action also by the additional action of centrifugal forces, whereby an accordingly rapid rotation may be ensured to apply the desired centrifugal forces. By the simultaneous action of such centrifugal forces in the interior of the reactor, even foaming products can be processed in a particularly advantageous manner, and optionally formed foam can be effectively destroyed. At the same time, the rotor provides the tools for the mechanical treatment of the thin film, which in the simplest case may be comprised of wipers, rollers, doctor blades or the like. In this respect, the configuration is advantageously devised such that the radial arms carry rods, scrapers, wipers or rollers extending in the direction of the axis of rotation. Such rods, scrapers, wipers or rollers may naturally also be slightly inclined relative to the axis of rotation, and this, in particular, if the reactor comprises a substantially funnel-shaped, conical inner shell. Said rods, scrapers, wipers and/or rollers will preferably extend in a substantially axial direction, if a substantially cylindrical reactor is used.

In order to provide a simple rotor drive, the configuration may advantageously be devised such that the rotor shaft is connected with a drive via a magnetic coupling.

In order to be able to readily apply the medium to be subjected to extraction, in a reactor of this type, close to the inner surface of the reactor wall, the configuration in an advantageous manner is devised such that the charging opening is designed as a radial and axial bore provided in a lid capable of being sealingly connected with the tubular reactor, wherein a sealing connection is ensured in a simple manner in that the reactor is designed as a tube including flanges connected to the tube ends, and that the lids capable of being sealingly connected in a pressure-tight manner are attachable to said flanges.

DETAILED DESCRIPTION OF THE INVENTION

In the following, the invention will be explained in more detail by way of an exemplary embodiment of the device according to the invention for carrying out the method of the invention, which is schematically illustrated in the drawing. In the drawing, a pressure-tight reactor, which is designed in a cylindrical or tubular manner, is denoted by 1. The reactor 1 can be closed in a pressure-tight manner by the aid of a lid portion 2 and a bottom portion 3, the connection being realized via flanges 4 and 5. In the lid portion 2, a stirrer 6 comprising a magnetic coupling for rotationally driving a stirrer shaft 7 is arranged. The stirrer shaft 7, in turn, is connected with the rotor 8, which is mounted in the interior of the reactor 1 so as to be rotatable about an axis of rotation 9. The respective guiding or centering of the rotor is realized via a mandrel 10 firmly connected with the bottom portion 3. The rotor 8 carries several guide rods 11 arranged in a circularly distributed manner, which serve to guide the rotationally mounted rollers 12 in a manner so as to enable the rollers 12 to roll down along the inner circumference 13 of the reactor 1 at a rotation of the rotor 8 about the axis of rotation 9.

A charging opening 14 for the liquid or dispersion to be treated is provided in the lid 2. The charging opening opens into the cylindrical reactor space in the region of the inner circumference 13 of the reactor 1. By pressing in, via the charging opening 14, the liquid or dispersion to be treated, said liquid or dispersion is conveyed in the interior of the reactor 1 in the direction towards the discharge opening 15 while being pressed downwards in the annular gap defined between the inner circumference 13 of the reactor 1 and the outer periphery of the rotor. In this region, the liquid or dispersion to be treated is mechanically acted on by the rotating roller 12 so as to cause an extremely thin liquid film to form between the rotating rollers 12 and the inner circumference 13 of the reactor 1. The thickness of the liquid film is determined by the preset distance of the rollers 12 relative to the inner shell 13 of the reactor 1. The rollers 12 may have helical profiles, yet may also be conically, concavely or convexly designed, said profiles, at the same time, promoting the downward movement of the liquid film in the direction towards the discharge opening 15 during rolling down along the liquid film.

An extraction agent preferably comprised of liquid or supercritical carbon dioxide is introduced into the reactor in counterflow to the liquid or dispersion to be treated, the pertinent charging opening being formed in the bottom portion 3 and denoted by 16. The extraction agent rises in the interior of the reactor 1 and gets into intensive contact with the liquid film, with the liquid film surface exposed to the extraction agent being constantly renewed by the milling or kneading procedure induced by the rotating rollers 12. The extraction agent loaded with the extracted ingredient may subsequently be drawn off via the discharge opening 17 provided in the lid 2.

A closeable opening 18 is additionally provided to allow for the taking of samples or the checking of various operating parameters during operation. Another such opening may also be provided in the bottom portion 3.

Furthermore, the pressure-tight reactor 1 is surrounded by heating and/or cooling jackets 19 and 20, through which a heating and/or cooling liquid, respectively, and, in particular, water may pass in coflow with, or counterflow to, the liquid or dispersion to be treated.

The invention claimed is:

1. A method for extracting impurities from liquids or solids dispersions by using one of supercritical and liquid carbon dioxide as an extraction agent, the method comprising the steps of:
   applying the liquid or dispersion as a thin film in a pressure-tight reactor; and
   treating the surface of the thin film with the one of the supercritical or liquid carbon dioxide, in a counterflow direction, whereby the surface of the thin film is constantly renewed over at least a portion of a layer thickness of the thin film by mechanically acting on said liquid or dispersion by the aid of one of wipers, rollers or doctor blades, while simultaneously adjusting the thickness of the thin film, discharging the liquid or dispersion separately from one of the supercritical and liquid carbon dioxide, and
   simultaneously adjusting the thickness of the thin film and promoting axial movement of the thin film toward a discharge orifice by means of rollers having one of a helical, a conical, a convex and a concave profile.

2. A device for extracting impurities from liquids or solids dispersions by using one of supercritical or liquid carbon dioxide as an extraction agent, including a pressure-tight reactor (1) having at least one charging opening (14) for the liquid or dispersion to be treated and the one of the supercritical and liquid carbon dioxide (16) as well as separate discharge openings (15, 17),
   wherein the charging opening (14) for the liquid or dispersion to be treated opens on the inner shell (13) of the reactor (1), and that a rotor (8) as radial arms which are arranged in the interior of the reactor (1) and carry at least one of rods (11), scrapers, wipers or rollers (12) extending in the direction of the axis of rotation (9), the radial arms of said rotor cooperating with the liquid or dispersion film on the inner shell (13) of the reactor (1), and the charging opening for the liquid or dispersion to be treated and the charging opening for the one of the supercritical and liquid carbon dioxide are arranged on opposite sides of the reactor, and
   a plurality of radial arms rotationally support a plurality of rollers (12) such that the rollers (12) are axially aligned adjacent the inner shell (13) of the reactor (1), the rollers (12) are spaced from the inner shell (13) of the reactor (1) by a preset distance, which defines a thickness of the liquid or dispersion film, and the rollers (12) having one of a helical, a conical, a concave and a convex profile to promote movement of the liquid or dispersion film to a discharge opening.

3. The device according to claim 2, wherein the reactor (1) comprises a substantially cylindrical or funnel-shaped conical inner shell (13).

4. The device according to claim 2, wherein a rotor shaft (7) is connected with a drive (6) via a magnetic coupling.

5. The device according to claim 2, wherein the charging opening (14) is a radial and axial bore provided in a lid (2) capable of being sealingly connected with the tubular reactor (1).

6. The device according to claim 2, wherein the reactor (1) is a tube which has flanges (4, 5) connected to the tube ends, and the lids (2, 3) capable of being sealingly connected in a pressure-tight manner are attachable to the flanges (4, 5).

* * * * *